United States Patent [19]

Gravisse

[11] Patent Number: 4,952,443

[45] Date of Patent: Aug. 28, 1990

[54] COVERING ELEMENT WITH A LIGHT CASCADE EFFECT FOR AGRICULTURAL APPLICATIONS

[76] Inventor: Philippe Gravisse, 18-20, rue de Presles, 75015 Paris, France

[21] Appl. No.: 324,886

[22] Filed: Mar. 17, 1989

Related U.S. Application Data

[63] Continuation-in-part of Ser. No. 45,023, Apr. 2, 1987, abandoned.

[30] Foreign Application Priority Data

Aug. 2, 1985 [FR] France .................................. 85 11844
Aug. 1, 1986 [WO] World Int. Prop. O. .......................... PCT/FR86/00276

[51] Int. Cl.$^5$ .......................... B32B 3/10; B32B 3/30; A01G 13/02
[52] U.S. Cl. .................................... 428/131; 428/141; 428/220; 428/174; 47/26; 47/29; 47/DIG. 6; 425/179; 425/913

[58] Field of Search ............... 428/131, 141, 220, 913, 428/174, 179, 339; 47/26, 28.1, DIG. 6, DIG. 11

[56] References Cited

U.S. PATENT DOCUMENTS 4,134,875  1/1979  Tapia .................................. 47/29 X

FOREIGN PATENT DOCUMENTS 2640015  3/1978  Fed. Rep. of Germany .
2511840  4/1983  France .

Primary Examiner—Ellis P. Robinson
Assistant Examiner—Susan S. Rucker
Attorney, Agent, or Firm—Sughrue, Mion, Zinn, Macpeak & Seas

[57] ABSTRACT

The present invention relates to a covering element comprising (i) an organic matrix and (ii) luminescent doping materials, scintillating doping materials or mixtures thereof, which form at least one light cascade absorbing electromagnetic radiation in at least one first predetermined wavelength band in order to re-emit the same in at least one second predetermined wavelength band; and (iii) a diffusing material.

18 Claims, 2 Drawing Sheets

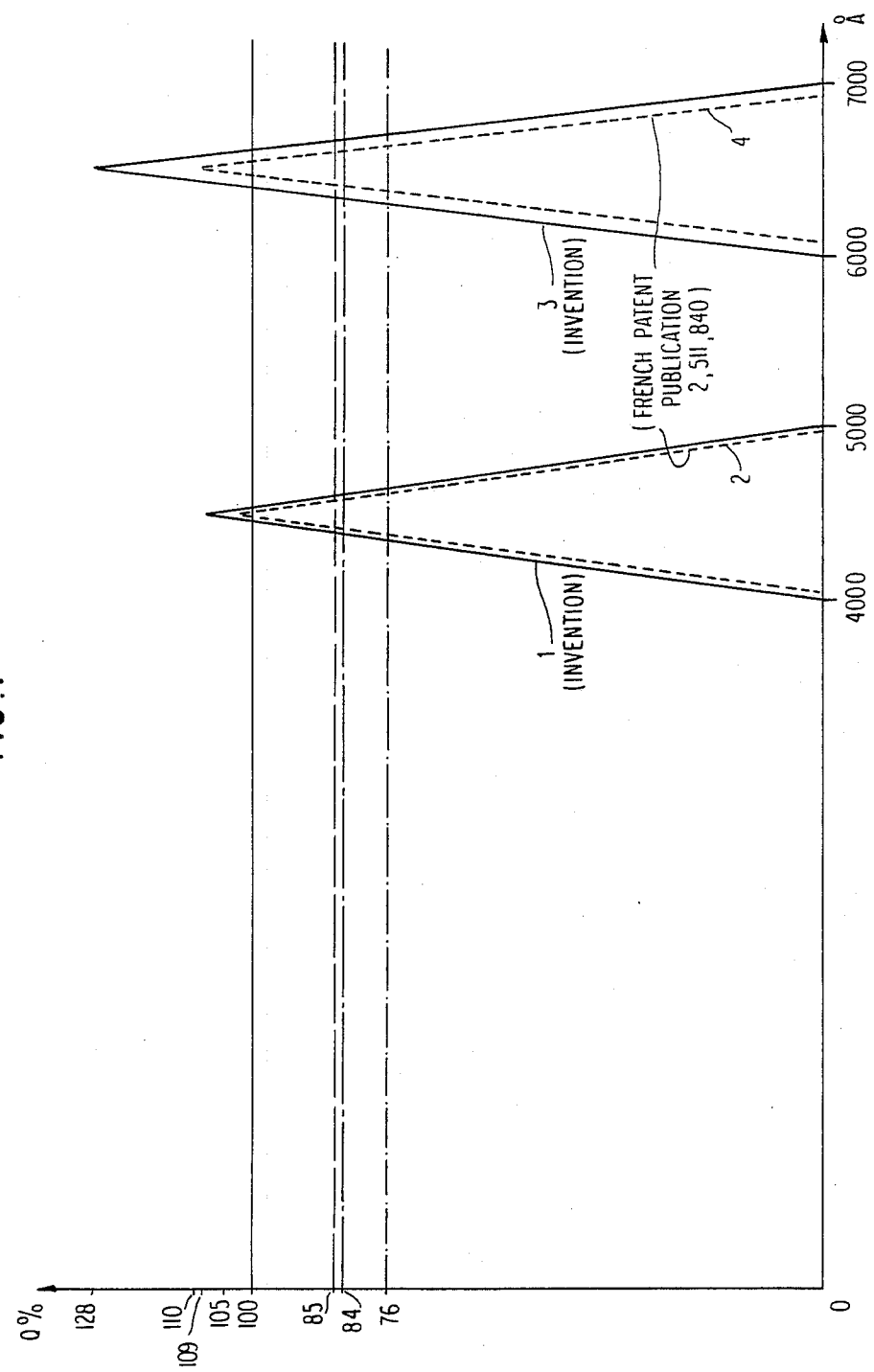

COVERING ELEMENT WITH A LIGHT CASCADE EFFECT FOR AGRICULTURAL APPLICATIONS

CROSS-REFERENCE TO RELATED APPLICATIONS

This application is a continuation-in-part of U.S. patent application Ser. No. 07/045,023, filed April 2, 1987 now abandoned.

FIELD OF THE INVENTION

The present invention relates to a covering element comprising (i) an organic matrix and (ii) luminescent doping materials, scintillating doping materials or mixtures thereof, which form at least one light cascade absorbing electromagnetic radiation in at least one first predetermined wavelength band in order to re-emit the same in at least one second predetermined wavelength band; and (iii) a diffusing material.

BACKGROUND OF THE INVENTION

Covering elements comprising (i) an organic matrix and (ii) luminescent doping materials, scintillating doping materials or mixtures thereof, which form at least one light cascade absorbing electromagnetic radiation in at least one first predetermined wavelength band in order to re-emit the same in at least one second predetermined wavelength band are known for use in agricultural greenhouses and as herbicidal films (French patent application Ser. No. 8,116,678, filed Sept. 2, 1981, which corresponds to French Patent Publication No. 2,511,840 and French patent application Ser. No. 8,508,385, filed June 4, 1985, which corresponds to U.S. patent application Ser. No. 07/022,640, filed Feb. 4, 1987 now abandoned.

French patent application Ser. No. 8,116,678 filed Sept. 2, 1981, which corresponds to French Patent Publication No. 2,511,840, teaches covering elements useful in agricultural greenhouses which absorb the wavelength bands which are detrimental to the development of plants while at the same time re-emit wavelength bands which promote the photosynthesis of the plants.

On the other hand, French patent application Ser. No. 8,508,385, filed June 4, 1985, which corresponds to U.S. patent application Ser. No. 07/022,640, filed Feb. 4, 1987, teaches covering elements useful as herbicidal films which absorb the wavelength bands which are favorable to the photosynthesis of plants while at the same time re-emit wavelength bands which are detrimental to the development of the plants.

The above two covering elements have provided excellent results during controlled experiments and use in various climates. However, these covering elements have two major disadvantages. First, the doping materials used to form the light cascades are very expensive. Second, the stability of the doping materials in the organic matrix is relatively limited. This considerably reduces the effective life span of the covering elements, which is a major disadvantage for agricultural applications.

SUMMARY OF THE INVENTION

An object of the present invention is to provide a covering element comprising (i) an organic matrix and (ii) luminescent doping materials, scintillating doping materials or mixtures thereof, which form at least one light cascade absorbing electromagnetic radiation in at least one first predetermined wavelength band in order to re-emit the same in at least one second predetermined wavelength band, wherein the covering element does not require relatively large amounts of doping materials to form the light cascade and in which the doping materials are stable so as to improve the effective life span thereof and so as to provide covering elements useful in agricultural greenhouses and as herbicidal films.

Other objects of the present invention will become apparent from the detailed description of the invention below.

In one embodiment, the above-described objects of the present invention have been met by a covering element comprising:

(i) an organic matrix, (ii) luminescent doping materials, scintillating doping materials or mixtures thereof, which form at least one light cascade absorbing electromagnetic radiation in at least one first predetermined wavelength band in order to re-emit the same in at least one second predetermined wavelength band, and (iii) a diffusing material in a size and amount sufficient to diffuse the incident solar radiation.

BRIEF DESCRIPTION OF THE DRAWINGS

FIG. 1 shows the shading effect (Q) obtained with (i) a conventional covering element which does not contain doping materials and thus does not form a light cascade, (ii) the covering element described in French patent application Ser. No. 8,116,678, filed Sept. 2, 1981, which corresponds to French Patent Publication No. 2,511,840, which does contain doping materials and thus forms a light cascade, and (iii) the covering element of the present invention. The light cascade effect obtained with the covering element of the present invention as compared with that obtained with the covering element described in French patent application Ser. No. 8,116,678, filed Sept. 2, 1981, which corresponds to French Patent Publication No. 2,511,840 is also shown in FIG. 1.

DETAILED DESCRIPTION OF THE INVENTION

Figure 3:
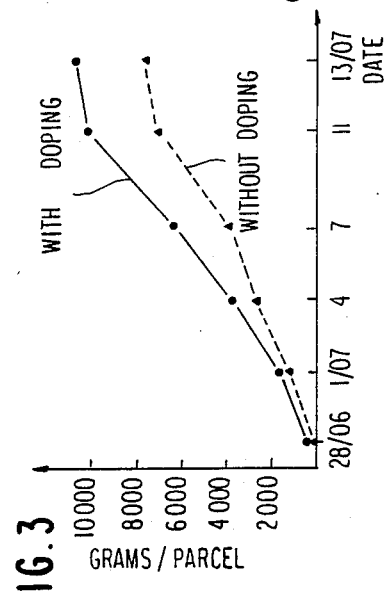
FIGS. 2-5 show the improved yield obtained from the cultivation of various varieties of beans under an agricultural tunnel using the covering element of the present invention as compared with using the conventional covering element which does not contain doping materials and thus does not form a light cascade (C.V. Talisman (FIG. 2). C.V. Martingal (FIG. 3). C.V. Calvy (FIG. 4) and C.V. Cristal (FIG. 5))

As described above, in one embodiment, the invention comprises:

(i) an organic matrix, (ii) luminescent doping materials, scintillating doping materials or mixtures thereof, which form at least one light cascade absorbing electromagnetic radiation in at least one first predetermined wavelength band in order to re-emit the same in at least one second predetermined wavelength band, and (iii) a diffusing material in a size and amount sufficient to diffuse the incident solar radiation.

The covering elements of the present invention include those of the type described in French patent application Ser. No. 8,116,678, filed Sept. 2, 1981, which corresponds to French Patent Publication No. 2,511,840 which are useful in agricultural greenhouses and absorb wavelength bands which are detrimental to the development of plants while at the same time re-emit wavelength bands which promote the photosynthesis of the plants.

Furthermore, the covering elements of the present invention also include those of the type described in French patent application Ser. No. 8,508,385, filed June 4, 1985, which corresponds to U.S. patent application Ser. No. 07/022,640, filed Feb. 4, 1987, which are useful as herbicidal films and absorb the wavelength bands which promote the photosynthesis of plants while at the same time re-emit wavelength bands which are detrimental to the development of the plants.

The particular organic matrix employed in the present invention is not critical thereto. Examples of such organic matrices include those of polymethylmethacrylate, polyethylene-ethyl-vinylacetate, polyamide, polystyrene, epoxy resin, polyester resin, polyvinyl chloride, polyvinyl alcohol, cellulose acetate and copolymers thereof.

The thickness of the organic matrix employed in the present invention is not critical thereto. Generally, the thickness is about 100 $\mu$m to 3.0 mm, preferably about 80 $\mu$m to 200 $\mu$m.

The luminescence doping materials employed in the present invention are not critical thereto. Examples of such luminescence doping materials include 2,5-diphenyloxazole (PPO), 1,4 bis[2-(5-phenyloxazoyl)]-benzene (POPOP), [9-(o-carboxyphenyl)-6-(diethylamino)-3H-xanthen-3-ylidene]diethylammonium chloride (Rhodamine B).

The luminescence doping materials are generally employed in an amount of from about $10^{-6}$ to $10^{-3}$ mol/liter, preferably from about $10^{-5}$ to $10^{-2}$ mol/liter.

The scintillating doping materials employed in the present invention are not critical thereto. Examples of such scintillating doping materials include PPO, POPOP and p-Bis (o-methylstyryl) benzene (Bis (MSB)).

The scintillating doping materials are generally employed in an amount of from about 0.1 to 5.0 g/kg, preferably from about 0.5 to 1.0 g/kg.

The doping materials can be introduced into the organic matrix by simple compounding or in accordance with known chemical grafting methods consisting of applying gamma-irradiation. Such methods give good results in terms of the stability of the doping materials in the organic matrix.

In the present invention, in addition to the doping materials, diffusing materials are introduced into the organic matrix. The diffusing materials increase the stability of the doping materials and the yield of light cascades. As a result, the diffusing materials enable the concentration of doping materials, which are very expensive products, to be considerably reduced.

The particular diffusing materials employed in the present invention can be inorganic materials, organic materials or water droplets.

Examples of inorganic materials which can be employed as diffusing materials in the present invention include titanium oxide, silica, magnesium oxide, barium sulfate, fluor, zirconium and phosphor. Titanium oxide is the preferred inorganic diffusing material.

Examples of organic materials which can be employed as diffusing materials in the present invention include polystyrene resin, polyester resin, dimethylformamide and polystyrene grafted on a polyethylene chain. Dimethylformamide is the preferred organic material.

The size of the inorganic materials, organic materials and water droplets employed are not critical to the present invention as long as they are large enough to diffuse the incident solar radiation. Generally, the size of the diffusing materials ranges from about 10 to 1,000 nm, preferably about 150 to 800 nm.

The amount of diffusing materials employed in the present invention is not critical thereto as long as they are present in sufficient quantity to diffuse the incident solar radiation. Generally, the amount of inorganic material employed is about 5 to 50% by weight, preferably about 10 to 20% by weight; the amount of organic material employed is about 5 to 50% by weight, preferably about 8 to 15% by weight, and the amount of water droplets employed is about 0.01 to 0.1% by weight, preferably about 0.01 to 0.05% by weight.

The diffusing materials can be introduced into the organic matrix by simply compounding or by emulsifying.

Excellent results can be obtained with inorganic materials, such as titanium oxide or silica, when used in concentrations of approximately $3.0 \times 10^{-4}$ mole/liter for a covering element having a thickness of about 100 to 200 $\mu$m. Excellent results can also be obtained with organic materials such as polyester resin, when used in a concentration of about 10 to 20% by weight for covering elements having a thickness of about 100 to 200 $\mu$m.

In accordance with a preferred embodiment of the present invention, the organic matrix is a sheet of polyethylene-ethyl-vinyl-acetate having a thickness of about 100 to 200 $\mu$m which contains, as the diffusing material, polystyrene resin, in an amount about 10% to 40% by weight.

In accordance with yet another preferred embodiment of the present invention, the organic matrix is a sheet of polymethylmethacrylate having a thickness of about 3.0 mm which contains, as the diffusing material, water droplets, in an amount of about 1.0 to $3 \times 10^{-4}$ mole/liter.

In the embodiment of the present invention wherein wavelength bands which are detrimental to the development of plants are absorbed and wavelength bands which promote the photosynthesis of the plants are re-emitted, the absorption wavelength bands of the light cascade cover wavelengths of between 5000 Å and 6000 Å and greater than 7000 Å and the re-emission wavelength bands cover wavelengths of between 4000 Å and 5000 Å and between 6000 Å and 7000 Å, and the doping materials contain at least one first aromatic cyclic material having three nuclei and at least one second aromatic cyclic material having five nuclei.

In this embodiment, the concentration of the first aromatic cyclic material is approximately $5.0 \times 10^{-3}$ mole/liter and that of the second aromatic cyclic material is approximately $9.0 \times 10^{-4}$ mole/liter for a covering element having a thickness of about 100 to 200 $\mu$m.

This considerable reduction (100 times less) of the concentration of the doping materials over that employed in the covering elements of French patent application Ser. No. 8,116,678, filed Sept. 2, 1981, which corresponds to French Patent Publication No. 2,511,840, is possible because of the improved yield of the light cascades obtained due to the presence of diffusing materials in the organic matrix.

When such a covering element for agricultural greenhouses further contains as doping materials, a third and fourth aromatic cyclic materials, the concentrations of the third and fourth aromatic cyclic materials can also be reduced in the same proportions for a given sheet thickness without a reduction in the yield of light cascades. That is, the concentration of the third aromatic cyclic material is about $5.0 \times 10^{-4}$ mole/liter and the concentration of the fourth aromatic cyclic material is about 1.0 to $5.0 \times 10^{-5}$ mole/liter for a covering element having a thickness of about 100 to 200 $\mu$m.

In the embodiment of the present invention wherein wavelength bands which promote the photosynthesis of plants are absorbed and wavelength bands which are detrimental to the development of the plants is re-emitted, the absorption wavelength bands of the light cascades cover wavelengths of between 4000 Å and 5000 Å and between 6000 Å and 7000 Å while the re-emission bands cover wavelengths of between 5000 Å and 6000 Å and wavelengths of greater than 7000 Å, and the doping materials contain at least one first aromatic cyclic material and at least one second aromatic cyclic material.

In accordance with this embodiment of the present invention, the concentrations of said first and said second aromatic cyclic materials are about $5.0 \times 10^{-4}$ mole/liter and about $5.0 \times 10^{-4}$ mole/liter, respectively, for a covering element having a thickness of about 80 $\mu$m. This concentration of doping materials can be employed without a loss in the yield of the light cascades.

To further increase the yield of the light cascades in the covering element of the present invention, the covering element has microperforations regularly spaced over its entire surface. The diameter of the perforations is about 0.01 to 1.0 mm, preferably about 0.05 to 0.2 mm and their spacing is about 2.0 to 20 mm, preferably about 1.5 mm to 10 mm. These microperforations constitute veritable waveguides and prevent auto-absorption of the re-emission photons when their average path exceeds a given critical length.

The yield of light cascades is further improved when, on its surface exposed to incident solar radiation, the covering element has an anti-reflecting texture, such as a diamond point texture.

Practical tests have shown that in an unexpected manner, the presence of the diffusing materials increases not only the stability of the doping materials in the organic matrix but further considerably improves the yield of the light cascades. The reasons for these two combined results are not well understood but it is believed that the diffusing materials protect the doping materials against direct incident solar radiation which gives rise to an increase in their stability. In addition, due to the presence of the diffusing materials in the organic matrix, the length of the path of the photons of the incident solar radiation inside the organic matrix is increased. As a result, each photon has a greater probability of encountering at least one doping material during its path through the organic matrix. This considerably increases the yield of the light cascades for a given concentration of doping materials in a given thickness of the covering element.

The following examples are given for illustrative purposes only and in no way are intended to limit the scope of the present invention.

EXAMPLE 1

In this example, the incident solar radiation, as a function of wavelengths showing the shading effects, was measured as the percentage of the overall energy. The incident solar radiation was determined for (i) a conventional polyethylene-ethyl-vinyl-acetate film which does not contain doping materials and thus does not form a light cascade, (ii) the covering element described in French patent application Ser. No. 8,116,678, filed Sept. 2, 1981, which corresponds to French Patent Publication No. 2,511,840 which does contain doping materials and thus forms a light cascade, and (iii) the covering element of the present invention.

The conventional covering element is a polyethylene-ethyl-vinyl acetate film having a thickness of 80 $\mu$m.

The element according to French Patent No. 2,511,840 employed had the following composition:
Thickness of the film: 80 $\mu$m
Organic Matrix
polyethylene-ethyl-vinyl-acetate (14% by weight ethyl-vinyl-acetate)

| Doping Material | Concentration |
| --- | --- |
| UVITEX OB (Ciba-Geigy) | $1.0 \times 10^{-2}$ mole/liter |
| HOSTASOL Red GG (HOECHST) | $1.0 \times 10^{-2}$ mole/liter |

The covering element of the present invention employed had the following composition:
Thickness of the film: 80 $\mu$m
Organic Matrix
polyethylene-ethyl-vinyl-acetate (14% by weight ethyl-vinyl-acetate)

| Doping Material | Concentration |
| --- | --- |
| 2,5-diphenyloxazole (PPO) | $5.0 \times 10^{-3}$ mole/liter |
| 1,4 bis[2-(5-phenyloxazoyl)]-benzene (POPOP) | $9.0 \times 10^{-4}$ mole/liter |
| [9-(o-carboxyphenyl)-6-(diethylamino)-3H-xanthen-3-lidene]diethylammonium chloride (Rhodamine B) | $7.0 \times 10^{-4}$ mole/liter |
| Sulforhodamine 101 | $2.5 \times 10^{-4}$ mole/liter |
| Diffusing Material | Concentration |
| Polystyrene resin (0.8 $\mu$m) | 20% by weight |

The results are shown in FIG. 1.

For ease of consideration, the shading effect is shown as a uniform phenomenon over all of the wavelength bands covered by the incident solar radiation, i.e., in the form of linear curves parallel to the horizontal axis of FIG. 1. In FIG. 1, the upper line (reference line) indicates 100% of the energy of the incident solar radiation.

The line below the reference line shows the shading effect of the conventional covering element which does not contain doping materials and thus does not form a light cascade. As shown in FIG. 1, the shading effect is about 85% of the energy of the incident solar radiation.

The next line illustrates the shading effect of the covering element described in French patent application Ser. No. 8,116,678, filed Sept. 2, 1981, which corresponds to French Patent Publication No. 2,511,840 which does contain doping materials and thus which forms a light cascade. As shown in FIG. 1, the shading effect is about 84% of the energy of the incident solar radiation.

Finally, the lower line shows the shading effect of the covering element of the present invention. As shown in FIG. 1, the shading effect is only about 76% of the energy of the incident solar radiation. Thus, using the covering element of the present invention, a considerable shading effect is obtained which in itself is very advantageous because it prevents excessive heating of the greenhouse.

In addition, FIG. 1 shows Curves 1 to 4 which schematically illustrate the results of re-emission obtained due to the use of light cascades whose re-emission bands are situated in wavelengths which promote the photosynthesis of plants, i.e., between 4000 Å and 5000 Å and 6000 Å and 7000 Å.

Curves 2 and 4 show the re-emission obtained for the covering element described in French patent application Ser. No. 8,116,678, filed Sept. 2, 1981 which corresponds to French Patent Publication No. 2,511,840. As shown in Curves 2 and 4, the re-emission reaches energy levels of 105% and 110%, respectively, of the incident solar radiation in the two wavelength bands which promote the photosynthesis of plants.

Curves 1 and 3 show the results obtained for the covering element of the present invention. As shown in Curves 1 and 3, the re-emission reaches energy levels of 109% and 128%, respectively, of the incident solar radiation in the two wavelength bands which promote the photosynthesis of plants.

It can therefore be seen that the present invention provides both improvement in the shading effect of the covering element and in the yield of light cascades. Thus, the covering elements of the present invention constitutes a considerable and unexpected improvement over the covering elements of French patent application Ser. No. 8,116,678, filed Sept. 2, 1981, which corresponds to French Patent Publication No. 2,511,840.

EXAMPLE 2

Covering Elements A, B and C (according to the invention) were prepared essentially as described in French patent application Ser. No. 8,116,678, filed Sept. 2, 1981, which corresponds to French Patent Publication No. 2,511,840, but additionally containing diffusing materials. More specifically, the organic matrix, doping materials and diffusing materials shown below were admixed, then extruded and then laminated so as to form a film.

Covering Element A
Thickness of the film: 80 μm
Organic Matrix
polyethylene-ethyl-vinyl-acetate (14% by weight ethyl-vinyl-acetate)

| Doping Material | Concentration |
| --- | --- |
| PPO | $5.0 \times 10^{-3}$ mole/liter |
| POPOP | $9.0 \times 10^{-4}$ mole/liter |
| Rhodamine B | $7.0 \times 10^{-4}$ mole/liter |
| Sulforhodamine 101 | $2.5 \times 10^{-4}$ mole/liter |
| Diffusing Material | Concentration |
| Polystyrene resin (0.8 μm) | 20% by weight |

Covering Element B
Thickness of the film: 200μm
Organic Matrix
polyethylene-ethyl-vinyl-acetate (14% by weight ethyl-vinyl-acetate)

| Doping Material | Concentration |
| --- | --- |
| PPO | $2.0 \times 10^{-3}$ mole/liter |
| p-Bis(o-methylstyryl)benzene (Bis(MSB)) | $4.0 \times 10^{-4}$ mole/liter |
| Bis(MSB) | $2.5 \times 10^{-4}$ mole/liter |
| Bis(MSB) | $1.5 \times 10^{-4}$ mole/liter |
| Diffusing Material | Concentration |
| Polystyrene resin (0.5 μm) | 10% by weight |

Covering Element C
Thickness of the film: 80 μm
Organic Matrix
polyvinyl chloride

| Doping Material | Concentration |
| --- | --- |
| PPO | $2.0 \times 10^{-3}$ mole/liter |
| Coumarin 102 | $4.0 \times 10^{-4}$ mole/liter |
| Diffusing Material | Concentration |
| polystyrene resin (0.8 μm) | 15% by weight |
| magnesium oxide (0.1 μm) | 0.1% by weight |

The concentrations of the doping materials are a function of the thickness of the covering element. It can be noted that the concentrations employed in covering elements A B and C are much smaller (10 times less) than those employed in French patent application Ser. No. 8,116,678, filed Sept. 2, 1981, which corresponds to French Patent Publication No. 2,511,840, while providing a better yield of light cascades. The variations in the observed light cascades is due to the fact that the yield of light cascades is greater with diffused light than with direct light.

Thus, the covering elements of the present invention have two considerable advantages in their application as covering elements for greenhouses:

in direct light they form an advantageous diffuser screen which limits the heating of the greenhouse and narrows the distances between the maximum and minimum lighting, in direct light, the yield of the light cascades is better and promotes the photosynthesis of the plants in cloudy weather, particularly pre-season.

EXAMPLE 3

In this example, the cultivation of corn-salad was carried out under (i) a conventional polyethylene-ethyl-vinyl-acetate film of Example 1, (ii) the covering element according to French Patent No. 2,511,840 of Example 1 and (iii) the covering element of Exampe 2-C. The variety of corn-salad was VIT and basic parcels of forty cold frames were sown in November and completely harvested at the end of March of the following year. The results are shoWn in Table 1 below.

TABLE 1

| Covering element | Net weight harvested in kg | Yield in kg per cold frame | Index |
| --- | --- | --- | --- |
| Conventional Film | 29 | 0.73 | 100 |
| French Patent 2,511,840 | 35.9 | 0.90 | 124 |
| Covering Element C | 40.6 | 1.02 | 140 |

As shown in Table 1 above, the yield obtained with Covering element C of the present invention was 50% greater than that obtained with a conventional film and 25% greater than that obtained with the film of French Patent No. 2,511,840.

EXAMPLE 4

In this example, the cumulative yield of four varieties of beans obtained using a 200 μm polyethylene-ethyl-vinyl-acetate film which does not contain doping materials as compared with that obtained using covering element B as described in Example 2 was determined. The results are shown in FIGS. 2-5.

Figure 2:
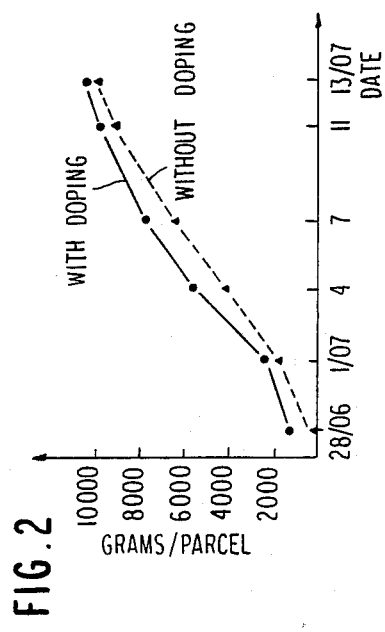
Figure 4:
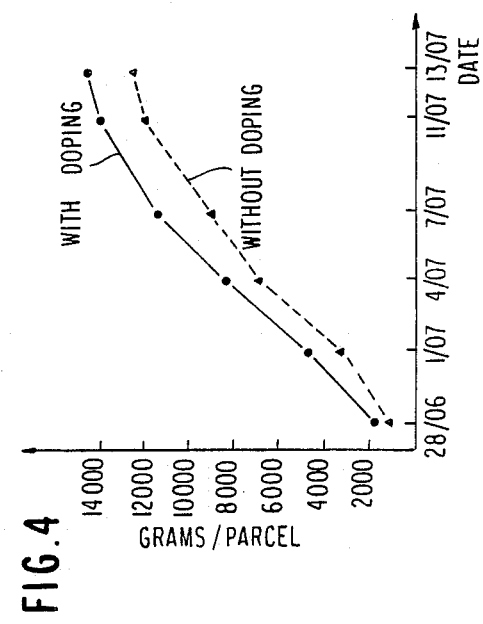

More specifically, FIGS. 2 to 5 show the cumulative yield, in grams/parcel per day of four varieties of beans. i.e., C.V. Talisman (FIG. 2). C.V. Martingal (FIG. 3). C.V. Calvy (FIG. 4) and C.V. Cristal (FIG. 5). which was obtained using covering element B. In FIGS. 2-5, the dotted lines show the cumulative yield obtained using 200 μm polyethylene ethyl-vinyl-acetate film which does not contain doping materials. The solid lines show the cumulative yield obtained using covering element B of the present invention.

Figure 5:
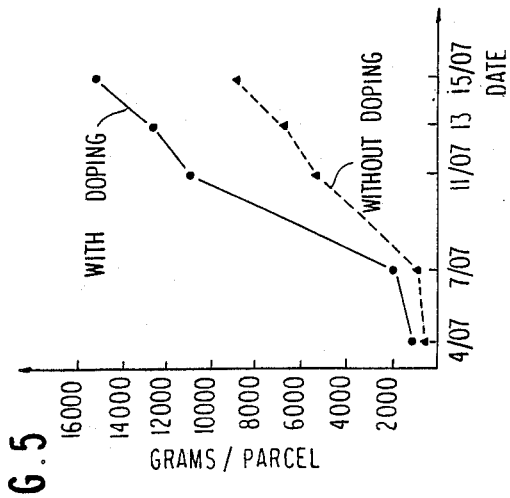

It can be seen from FIGS. 2-5 that use of the covering element of the present invention gives rise to an increased cumulative yield over the entire period of plant development. These results are particularly good for the C.V. Cristal variety (FIG. 5). In that case, the cumulative yield went from approximately 6,600 grams/parcel to 12,500 grams/parcel at the end of the harvest. This result was completely unexpected in view of the relatively low concentration of doping materials used in the covering element of the present invention.

EXAMPLE 5

As discussed above, the present invention is also applicable to the covering elements of French patent application Ser. No. 8,508,385, which corresponds to U.S. patent application Ser. No. 07/022,640, filed Feb. 4, 1987. In this case, the introduction of diffusing materials in the organic matrix also enables the concentration of the doping materials to be reduced while at the same time increasing the yield of the light cascades.

More specifically, for a covering element having an organic matrix of polyvinyl chloride, a thickness of about 80 μm and containing two aromatic cyclic materials, i.e., PPO and Coumarin 102, as doping agents, by introducing the diffusing materials, i.e.. 15% by weight of polystyrene and 0.1% by weight of magnesium oxide in accordance with the present invention (Example 2-C). the content of the doping materials could be reduced to values of about $2.0 \times 10^{-3}$ mole/liter and $4.0 \times 10^{-4}$ mole/liter, respectively. These amounts are about 10 to 50 times less required for covering elements which do not contain diffusing materials.

EXAMPLE 6

Using the procedure described in Example 1, the following materials were admixed so as to produce Covering Element D.

Covering Element D
Thickness of the film: 200 μm
Organic Matrix
polyethylene-ethyl-vinyl-acetate (14% by weight ethyl-vinyl-acetate)

| Doping Material | Concentration |
| --- | --- |
| PPO | 0.5 gram/kg |
| UNITEX OB (Ciba-Geigy) | 0.5 gram/kg |
| HOSTASOL Red GG (HOECHST) | 0.2 gram/kg |
| Diffusing Material | Concentration |
| Polystyrene resin (0.5 μm) | 10% by weight |

For comparison, an identical covering element was prepared but wherein the diffusing material was omitted.

The covering element of the present invention gave rise to a shadowing effect favorable to the development of plants containing chlorophyl. This shadowing effect enabled a decrease of the diurnal temperature inside the nursery of about 3° C., on the average, and an increase of the night temperature of about 3° C., on the average. This phenomenon prevented plants, grown inside nurseries, to be submitted to temperature variations which are too large and thereby cause damageable plant stress to occur.

This characteristic of nurseries covered by the covering element of the present invention is all the more remarkable since the nurseries known to date tend to increase the daily temperature differences.

The percentages of incidental diffuse radiation and strong radiation obtained using the covering element of the present invention as compared with that of the comparative example are shown in Table 2 below.

TABLE 2

| Covering Element | Incidental diffuse radiation (beginning of day, cloudy sky) | Strong radiation (sun at its zenith, no clouds) |
| --- | --- | --- |
| Comparative Example | 89% | 87% |
| Covering Element D | 73% | 64% |

Covering element D allows a strong attenuation of the energy entering the covering element when such is submitted to strong solar radiance. Thus an automatic climatization effect balancing the solar radiation is provided.

The spectral qualities of the covering element of the present invention are perfectly adapted to the needs of plants because of the existence of the two main wavelength bands in the blue spectrum (λ max 425) and in the red spectrum (λ max 625).

Using the covering element of the present invention, the increase of the dry weight of the plants is of about 20%, in comparison to similar plants grown in similar conditions, in conventional nurseries. This result is at the same time extremely favorable and unexpected. That is nurseries covered with diffusing particles have been known in France since the forties, i.e., covered using the liming (white-washing) method wherein the windows of the nurseries are covered, by the means of a brush, with lime and water. This is usually carried out in May. The effect of this method is to reduce, by about 50%, the luminosity transmitted and consequently the temperature inside the nursery as well. In September, the layer of lime and water must be removed by washing with water, so as to allow the sunlight to be fully transmitted. This method is not satisfactory and has been given up almost everywhere since the reduction of the energy transmitted occurs, on a permanent basis, in the totality of the solar spectrum, as well in the maximal lighting condition, when the sun is hazy.

While this invention has been described in detail and with reference to specific embodiments thereof, it will be apparent to one skilled in the art that various changes and modifications could be made therein without departing from the spirit and scope thereof.

I claim:

1. A covering element comprising:
   (i) an organic matrix,
   (ii) luminescent doping materials, scintillating doping materials or mixtures thereof, which form at least one light cascade absorbing electromagnetic radiation in at least one first predetermined wavelength band in order to re-emit the same in at least one second predetermined wavelength band, and
   (iii) a diffusing material in a size and amount sufficient to diffuse the incident solar radiation.

2. The covering element in accordance with claim 1, wherein the diffusing material is an inorganic material.

3. The covering element in accordance with claim 2, wherein the diffusing material is titanium oxide.

4. The covering element in accordance with claim 2, wherein the diffusing material is silica.

5. The covering element in accordance with claim 1, wherein the diffusing material is an organic material.

6. The covering element in accordance with claim 5, wherein the organic material is an organic resin.

7. The covering element in accordance with claim 1 wherein said organic matrix is a sheet of polyethylene-ethyl-vinyl-acetate having a thickness of about 100 to 200 $\mu$m and contains, as the diffusing material, a polystyrene resin, in an amount of about 10% to 20% by weight.

8. The covering element in accordance with claim 1, wherein said organic matrix is a sheet of polymethylmethacrylate having a thickness of about 3 mm and contains as the diffusing material, water, in an amount of about 1.0 to $3 \times 10^{-4}$ mole/liter.

9. The covering element in accordance with claim 1, wherein said covering element is useful in agricultural greenhouses, wherein the light cascade absorption bands cover wavelengths which are detrimental to the development of plants while the re-emission bands cover wavelengths which promote the photosynthesis of the plants, wherein the absorption wavelength bands of the light cascade cover wavelengths of between bands between 5000 Å and 6000 Å and greater than 7000 Å wherein the re-emission wavelength bands of the light cascade cover wavelengths of between 4000 Å and 5000 Å and between 6000 Å and 7000 Å, and wherein said doping materials comprise at least one first aromatic cyclic material having three nuclei and a second aromatic cyclic material having five nuclei, wherein the concentration of said first aromatic cyclic material is about $5.0 \times 10^{-3}$ mole/liter and the concentration of said second aromatic cyclic material is about $9.0 \times 10^{-4}$ mole/liter for a covering element having a thickness of about 100 to 200 $\mu$m.

10. The covering element in accordance with claim 9, further comprising a third aromatic cyclic material in an amount of about $5.0 \times 10^{-4}$ mole/liter, for an organic matrix having a thickness of about 100 to 200 $\mu$m.

11. The covering element in accordance with claim 10, further comprising a fourth aromatic cyclic material in an amount of about 1.0 to $5.0 \times 10^{-5}$ mole/liter, for an organic matrix having a thickness of about 100 to 200 $\mu$m.

12. The covering element in accordance with claim 1, wherein said covering element is useful as a herbicidal sheet, wherein the light cascade absorption bands cover wavelengths which promote the photosynthesis of plants while the re-emission bands cover wavelengths which are detrimental to the development of the plants, wherein the absorption wavelength bands of the light cascade cover wavelengths of between 4000 Å and 5000 Å and between 6000 Å and 7000 Å, where the re-emission wavelength bands of the light cascade cover wavelengths of between 5000 Å and 6000 Å and greater than 7000 Å, and wherein the doping materials comprise a first and a second aromatic cyclic material wherein the concentrations of said first and said second aromatic cyclic materials are about $5.0 \times 10^{-4}$ mole/liter and $5.0 \times 10^{-4}$ mole/liter, respectively, for a covering element having a thickness of about 80 $\mu$m.

13. The covering element in accordance with claim 1, wherein said doping materials are introduced into the organic matrix by compounding.

14. The covering element in accordance with claim 1, wherein said doping materials are introduced into the organic matrix by chemical grafting.

15. The covering element in accordance with claim 1, wherein said covering element has microperforations which are evenly spaced over its entire surface.

16. The covering element in accordance with claim 15, wherein the diameter of the microperforations is about 0.01 to 1.0 mm and the spacing between the microperforations is about 2.0 to 20 mm.

17. The covering element in accordance with claim 1 wherein, on its surface exposed to incident light, said covering element has an anti-reflecting texture.

18. The covering element in accordance with claim 17, wherein said anti-reflecting texture is a diamond-point texture.

* * * * *